United States Patent [19]
Betzler

[11] 3,711,130
[45] Jan. 16, 1973

[54] FERRULELESS BARBED TUBING CONNECTOR

[75] Inventor: Mark H. Betzler, Wilkes Barre, Pa.

[73] Assignee: Air Products and Chemicals, Inc., Allentown, Pa.

[22] Filed: Nov. 9, 1970

[21] Appl. No.: 87,705

[52] U.S. Cl. ................................. 285/239, 285/259
[51] Int. Cl. ............................................. F16l 33/00
[58] Field of Search ....... 285/239, 259, 256, 238, 174

[56] References Cited

UNITED STATES PATENTS 2,805,088   9/1957   Cline et al. ........................... 285/239

Primary Examiner—David J. Williamowsky
Assistant Examiner—Wayne L. Shedd
Attorney—Ronald B. Sherer, James C. Simmons and B. Max Klevit

[57] ABSTRACT

A push-on fitting to be used for holding deformable synthetic tubing in place without auxiliary hose clamps or ferrules. The connector is characterized in that a plurality of spaced-apart ribs or barbs having a fixed dimensional relationship to the tubing are the operative means for securing the tubing to the connector.

1 Claim, 2 Drawing Figures

PATENTED JAN 16 1973

3,711,130

MARK H. BETZLER

INVENTOR.

BY James C. Simmons

ATTORNEY 3,711,130

FERRULELESS BARBED TUBING CONNECTOR

BACKGROUND OF THE INVENTION

This invention pertains to tube or hose fittings and in particular those fittings that have frusto-conical shaped barbs that are used in combination with a clamp or ferrule to hold the hose or tube securely to the fitting. Such connectors are used for clamping ordinary water hoses to the adapters for connections to faucets and nozzles. Such connectors are also used in the welding art for connecting the various water and gas hoses to the welding torch as in a metal inert gas commonly referred to as a MIG Torch or a tungsten inert gas commonly referred to as a TIG Torch. Examples of welding torches wherein hose or tubing connectors are used are shown in U.S. Pat. Nos. 3,238,350 and 3,525,845.

Most prior art hose or tubing connectors containing barbed surfaces that engage the inner diameter of the tubing require a hose clamp or ferrule around the outside of the tube to assure a fluid-tight seal between the hose and the fitting. In those applications, such as in a small welding torch, where there is not much space in the handle of the torch, a crimped ferrule is usually applied over the hose to assure a gas-tight seal. This requires tools and spare parts should leaks or holes develop in the hose so that it would necessitate a replacement or repair of the hose.

SUMMARY OF THE INVENTION

In order to avoid the above mentioned problems and to provide an improved tubing connector and one that is especially useful for synthetic tubing such as polyethylene, it has been discovered that when the barbs on the tubing connector have a major diameter that bears a defined relationship to the inner diameter to the tube being connected and are spaced apart in a predetermined relationship a superior tubing connector results. The improved tubing connector does not require a ferrule or hose clamp in order to achieve a fluid-tight reliable pressure seal of the hose to the hose connector. Furthermore, the tubing can be readily cut away and replaced without the need for specialized tools.

DESCRIPTION OF THE PREFERRED EMBODIMENT

Figure 1:
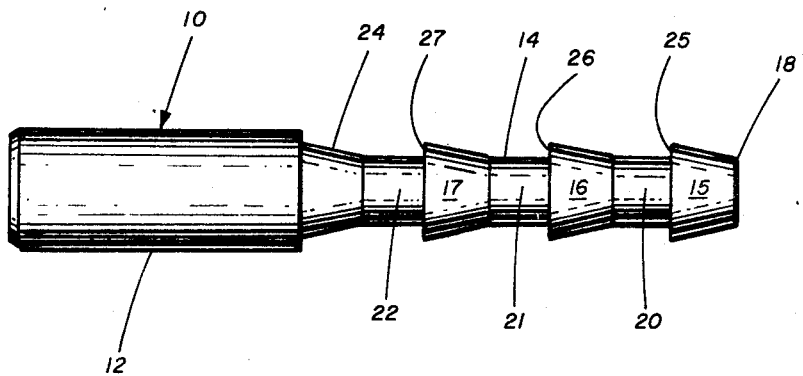
FIG. 1 is a plan view of a tubing connector according to the present invention.

Referring to the drawing there is shown in FIG. 1 a tubing connector 10. The tubing connector 10 contains a body portion 12 for connecting to a welding torch, a regulator, or other source of high pressure fluid. Opposite to the body end 12 of connector 10 is the barbed end 14 containing a plurality of generally frusto-conical barbs 15, 16, 17. The end-most barb 15 contains a generally rounded face 18 to facilitate insertion into the tube or hose. The barbs 15, 16, 17 are spaced apart from one another defining generally cylindrical land sections 20, 21, 22. The innermost land section 22 is joined to the body member 12 by a transition area 24 which has the general shape of a frusto-conical section. The shape of section 24 is not critical, it is shown in the drawing as a frusto-conical section for convenience.

It has been discovered that when the barbs 15, 16, 17, and the lands 20, 21, 22 bear fixed dimensional relationships to the inside diameter of the hose or tubing, the hose or tubing will form a reliable pressure tight seal to the connector 10. It has been discovered that the large diameter ends 25, 26, 27 of barbs 15, 16, 17 respectively should be a minimum of 0.062 inches larger than the inside diameter of the tubing for which the connector will be used. This will cause the tube to be spread or flared so that when the connector is fully inserted the tube will return to its original size to securely and completely surround at least a portion of the length of each land surface 20, 21, 22. It has further been discovered that the outside diameter of the cylindrical land sections 20, 21, 22 should be not larger than three-fourths the diameter of the large end of the barbs 15, 16, 17 and the distance between the barbs should be a minimum two-thirds of the diameter of the large end of the barbs 15, 16, 17 in order for the tubing to seat behind the barb on the land surface. If these dimensional relationships are not observed the tubing will be difficult fit and will not form a fluid tight seal.

Figure 2:
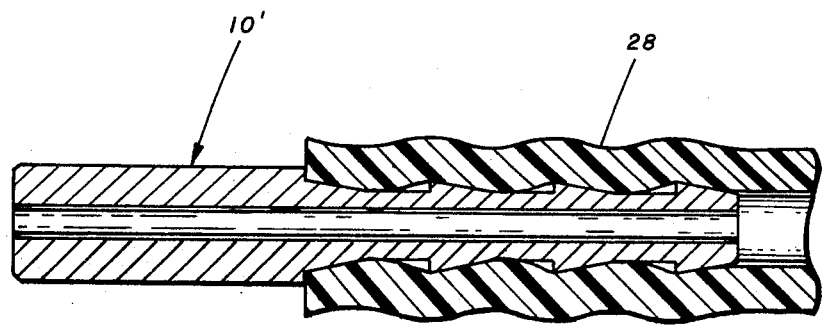
FIG. 2 is a longitudinal section through a tubing connector according to the present invention shown inserted into the length of the hose.

As shown in FIG. 2, the tubing connector 10' has disposed thereon a section of flexible tubing 28. The tubing 28 can be any synthetic material that is capable of cold flow such as polyethylene. When the connector 10' is forced into the tube 28 and the tubing has surrounded the entire barbed end, as shown in FIG. 2, the tubing will return to its normal size and securely contact the land portions of the tubing connector 10'. This results in a fluid-tight seal between the connector and the tube. The connector will also withstand normal operating gas pressures and not be blown away from the connector. This eliminates the need for a ferrule to force the tubing around the barbed end of the connector.

As long as the above dimensional relationships are observed, a reliable tubing connector can be achieved for those sizes of tubing normally employed in, among other things, the welding arts. A tubing connector of this type eliminates the need for special tools for assembly, assures a more rapid connection, makes it possible for easy replacement of the tubing if a leak develops therein at some point remote from the connector or at the connector, and yields a connection with high pull strength. Once the tubing is placed on the connector is can only be removed by cutting away that portion of the tubing engaging the connector.

The preferred material of construction for the tubing connector is metal such as brass or stainless steel.

If desired, a ferrule, wire, or other clamp may be used with the connector of this type as a double safety measure. However, in most ordinary applications such a ferrule or clamp is unnecessary.

Having thus described my invention the following is desired to be secured by Letters Patent of the United States.

I claim:

1. A connector of the push-on type for flexible cold flowable synthetic tubing consisting of a hollow cylindrical body, disposed around said body in spaced relationship at least three frusto-conical shaped barbs;

each of said barbs being of identical size and shape and having a large diameter end at least 0.062 inches larger than the nominal manufactured inside diameter of the tube for which it will be used; between each of said barbs cylindrical land sections of substantially equal outside diameters, said diameter not exceeding three-quarters the diameter of the large end of said frusto-conical barb, said lands being of substantially equal length, said length being at least two-thirds the diameter of the large end of the frusto-conical barb; whereby when said connector is inserted into a tube said tube flows around said cylindrical sections to provide a gas tight permanent seal without an auxiliary ferrule crimped over said tube adjacent said barbs.

* * * * *